United States Patent [19]
Johnson

[11] Patent Number: 5,086,680
[45] Date of Patent: Feb. 11, 1992

[54] APPARATUS FOR JOB-SITE CUTTING OF INSULATION

[76] Inventor: Gary E. Johnson, N6402 County Trunk G, Scandanavia, Wis. 54977

[21] Appl. No.: 480,792
[22] Filed: Feb. 16, 1990
[51] Int. Cl.⁵ .......................... B26D 7/18; B26D 7/20
[52] U.S. Cl. ...................................... 83/167; 83/614; 83/522.25
[58] Field of Search ............... 83/522.11, 522.25, 614, 83/408, 487, 485

[56] References Cited

U.S. PATENT DOCUMENTS

| | | |
|---|---|---|
| 397,843 | 2/1889 | Everding . |
| 855,301 | 5/1907 | Gobie ..................................... 83/485 |
| 1,152,093 | 8/1915 | Isaacs . |
| 1,672,416 | 6/1928 | LaClair . |
| 2,420,460 | 5/1947 | Bowdoin et al. ...................... 83/614 |
| 2,724,435 | 11/1955 | Omenson, Jr. ......................... 83/614 |
| 2,833,350 | 5/1958 | Merkur ................................ 83/614 |
| 3,527,131 | 9/1970 | Ellerin ................................ 83/614 |
| 3,605,537 | 9/1971 | Pickler ................................ 83/121 |
| 3,659,487 | 5/1972 | Henderson ............................ 83/485 |
| 3,863,821 | 2/1975 | Van Bennekon ...................... 225/93 |
| 3,890,868 | 6/1975 | Pickler ................................ 83/408 |
| 4,809,437 | 3/1989 | Saliaris ................................ 50/319 |

Primary Examiner—Mark Rosenbaum
Assistant Examiner—Scott A. Smith
Attorney, Agent, or Firm—Jansson & Shupe, Ltd.

[57] ABSTRACT

A cutting apparatus for fiberglass insulation and the like for use at home or on construction sites. The apparatus includes a workboard with a groove thereacross and a blade which may be moved through the groove to cut fiberglass insulation placed on the workboard. An elongated handle attached to the blade allows insulation to be cut from a standing position. Fiberglass leavings are collected in a chamber associated with the groove so as to not impede the cutting operations. Collection of the leavings and cutting from a standing position reduce the respiratory hazard associated with airborne fiberglass fibers. The apparatus permits individual pieces of fiberglass insulation to be cut to size in a non-factory setting quickly and without waste of material.

20 Claims, 4 Drawing Sheets

APPARATUS FOR JOB-SITE CUTTING OF INSULATION

FIELD OF THE INVENTION

This invention is related generally to fiberous insulation cutting devices and, more particularly, to fiberglass insulation cutting devices for home or construction site use.

BACKGROUND OF THE INVENTION

Installation of fiberglass insulation is often part of numerous and varied building construction activities. For most purposes, such insulation is mass-produced in long length and rolled-up for transport and storage prior to use. Invariably, this type of insulation must be cut to a desired length and/or width. For example, home construction and sheet metal applications usually require insulation cut along its length at a constant width. Material waste, code violations, and poor insulating qualities may result if the insulation is not cut properly.

Early concern over poorly-cut insulation fostered the use of several highly-mechanized cutting devices. Several, which have been used with some success, are characterized by rolling, cutter blades and automatic insulation feeders. A sharp blade with a narrowly-tailored groove cuts fiberglass insulation as it is mechanically pulled through the groove. Such devices cut insulation at a desired length and constant width, but are, for the most part, limited in use to factory or shop settings because of their large size and stationary nature.

Generally, these cutting devices are motor driven and intricate in design. Once adjusted or calibrated, they work well in a situation where many pieces of insulation of constant length and width are required. High volume justifies a hefty price-tag. However, for several pieces of fiberglass insulation of unique length and width, as are often needed at a construction site, the use of cutting devices of the prior art is substantially less than satisfactory, in terms of cost effectiveness and their considerable size. They are even less satisfactory for home use by the weekend do-it-yourselfer.

The search for an efficient, effective fiberglass insulation cutting device for use at home or on construction on sites, meeting the requirements stated above, has been an ongoing concern in the art. One approach, which is wide-spread but of limited success, is the use of a blade in conjunction with a straight-edge, cutting guide. Typically, a utility knife or another sharp portable blade is pulled through the insulation and guided by a straight-edge laid loosely on the insulation surface.

One major problem is that these devices of the prior art rarely provide the desired cut. As is often the situation, the straight-edge moves during use, usually by action of the utility knife against it. The result is a piece of fiberglass insulation not cut as measured and apt to provide poor insulation qualities. The inefficient use of material is obviously a short-term problem. In the long-term, higher heating bills continue the economic cost.

Another significant problem is that blades of the prior art tend to tear through the insulation. Repeated slices downward through the insulation rip or shred fibers. A deleterious side effect, and one receiving an increasing amount of attention in the medical community, is that insulation fibers often become airborne and a respiratory hazard to any worker unfortunate enough to be close. Again, a shredded or ripped piece of insulation is less likely to insulate well is one cut neatly.

In summary, a considerable number of drawbacks and problems exist in the art relating to fiberglass insulation cutting devices. There is a need for a fiberglass insulation cutting apparatus usable at home or at construction sites, without waste of material and without an associated respiratory hazard.

OBJECTS OF THE INVENTION

It is an object of this invention to provide an improved fiberglass insulation cutting apparatus overcoming some of the problems and shortcomings of the prior art.

Another object of this invention is to provide an improved fiberglass cutting apparatus which is simplistic in design and available at relatively low cost.

Another object of this invention is to provide an improved fiberglass cutting apparatus which is portable, lightweight, yet durable, and useful at home or on construction sites.

Another object of this invention is to provide an improved fiberglass cutting apparatus such that fiberglass insulation may be cut to varying sizes quickly, efficiently, and without waste of material, at non-factory settings.

Another object of this invention is to provide an improved fiberglass cutting apparatus such that respiratory hazards associated with airborne fiberglass fibers are substantially reduced.

These and other important objects will be apparent from the descriptions of this invention which follow.

SUMMARY OF THE INVENTION

This invention is an apparatus for cutting fiberglass insulation at home or on a construction site. It overcomes certain well-known problems and deficiencies, including those outlined above. More specifically, this cutting apparatus allows a homeowner or a construction worker to cut individual pieces of fiberglass insulation to size, efficiently and economically. The potential respiratory hazards associated with cutting fiberglass insulation are reduced as the cutting apparatus allows insulation to be cut from a standing position. The entire apparatus is lightweight and mechanically uncomplicated, making it portable, low-cost, and ideal for use in a non-factory setting.

This fiberglass insulation cutting apparatus includes a workboard with an outwardly-facing groove thereacross, means insertable in the groove and movable therealong to cut insulation, and means for moving the cutting means in the groove across the workboard. Fiberglass insulation placed on the workboard may be divided at the groove. In preferred embodiments, the workboard has a continuous lower member forming the bottom of the groove and two upper members, on the lower member, which have opposed inner edges spaced from one another, forming the sides of the groove. In highly preferred embodiments, the two upper members are each divided into two separate parts, forming a substantially perpendicular cross-groove.

In preferred embodiments, each upper member is spaced from the lower member to form a void, such that fiberglass leavings do not obstruct the groove. In highly preferred embodiments, the void is formed by spacers sandwiched between the upper and lower members. The spacers may be placed along the groove such that support is provided along the groove and fiberglass leavings do not obstruct the groove during cutting operations.

In preferred embodiments, the edges of the upper members are reinforced by overlays positioned along the groove. In highly preferred embodiments, the overlays are inset in the upper members to protect them from repeated cutting operations.

In preferred embodiments, the workboard includes an extension moveably attached to it. The extension also has a groove which is alignable with that of the workboard to provide an extended groove and work surface. In highly preferred embodiments, the workboard and extension are joined by a hinge such that they may be folded onto each other and secured when not in use. The workboard and extension, when folded onto each other, form an inner chamber. When not in use, the cutting and moving means may be stored within the chamber.

In preferred embodiments, the workboard has a nonskid surface and linear markings. A non-skid surface allows fiberglass insulation to be cut without significant movement of it along the workboard. Linear markings on the workboard allow the insulation to be positioned and cut without a separate measuring step.

The cutting means is a substantially round disk blade, rotatably attached to a moving means. The disk blade has a radius greater than the combined depth of the groove and the thickness of fiberglass insulation placed on the workboard. In preferred embodiments, the blade has a width such that it is freely received by the groove. Fiberglass insulation placed on the workboard is cut as the blade is moved through the groove. In highly preferred embodiments, the groove width and groove-to-blade width ratio are chosen such that the blade is freely received by the groove, but does not impede cutting operations by drawing uncut insulation into the groove.

The moving means of the cutting apparatus is an elongated handle with upper and lower ends. The blade is attached to the lower end of the handle, whereby insulation may be readily cut from the standing position.

As previously noted, a fiberglass insulation cutting apparatus for use at a non-factory setting has certain advantages. Individual pieces of insulation may be cut to size quickly and without waste of material. Uncut insulation is placed on the workboard and over the groove. The disk blade is pulled through the groove and along the workboard. Linear markings on the workboard permit the insulation to be cut to a desired length and/or width.

Leavings from cutting operations are collected in the void between the upper and lower members of the workboard and may be removed through vents formed by spacers along the groove. This collection feature, used in conjunction with a long handle, minimizes the risk of exposure of a worker to airborne fiberglass insulation fibers.

DETAILED DESCRIPTIONS OF PREFERRED EMBODIMENTS

The drawings illustrate fiberglass cutting apparatus 10 which is a preferred embodiment of this invention. The apparatus includes a unique groove-blade combination, including work surface 10, in which may be carried blade mechanism 62.

Figure 1:
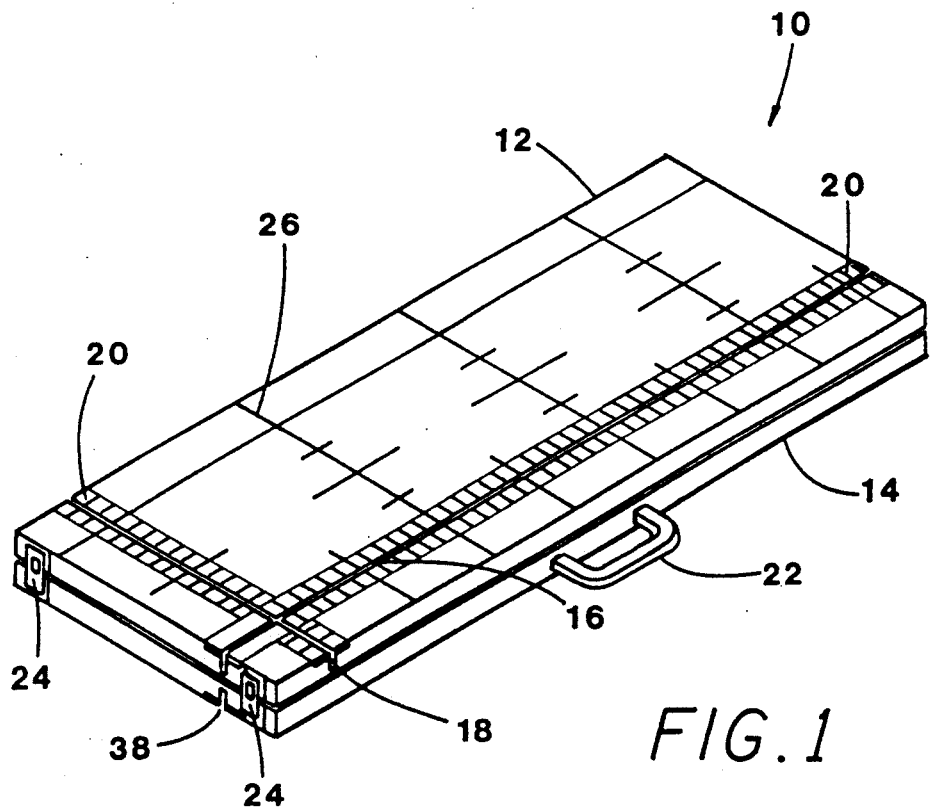
FIG. 1 is a full perspective view of the preferred fiberglass cutting apparatus in accordance with this invention.

As best shown in FIG. 1, surface 10 comprises workboard 12 and extension 14 which together form a surface upon which fiberglass insulation is cut. Workboard 12 has a length-wise groove 16, which is intersected in a perpendicular fashion by groove 18. Extension 14 also has a length-wise groove 38. In preferred embodiments, workboard 12 is recessed along grooves 16 and 18, and fitted with overlays 20 to protect it from wear associated with repeated cutting operations. Likewise, in preferred embodiments, extension 14 is recessed along groove 38 and fitted with overlay 20. Linear markings 26 assist in cutting fiberglass insulation to desired widths and lengths. Workboard 12 may be secured to extension 14 with fasteners 24. When secured in this fashion, work surface 10 may be carried with handle 22.

Figure 3:
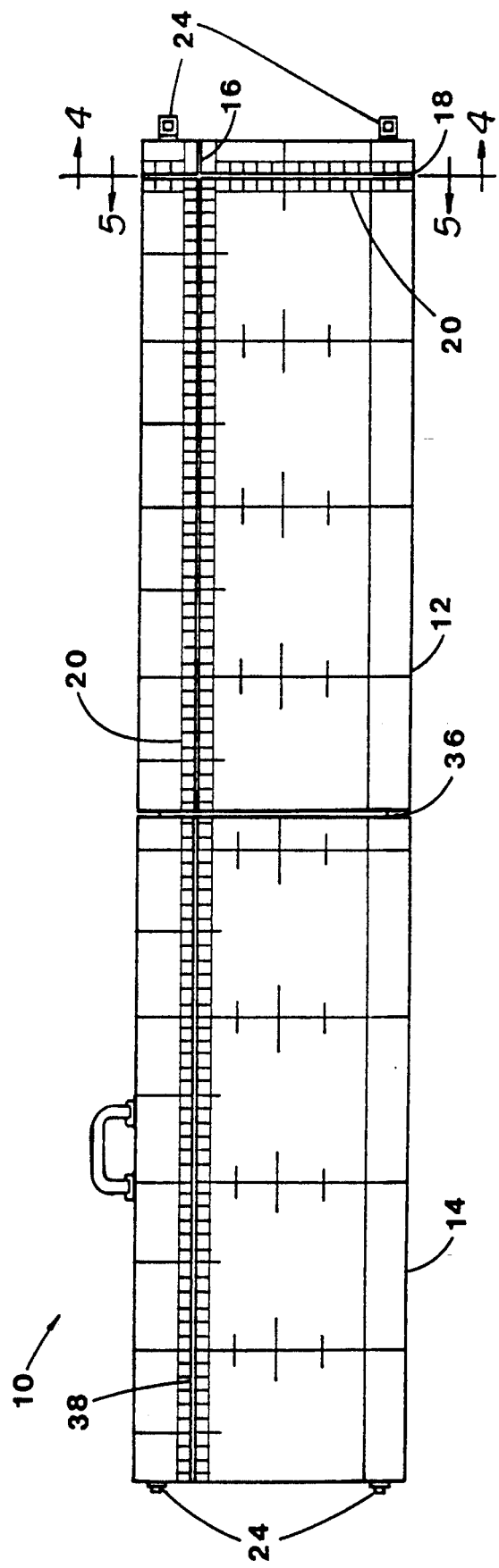
FIG. 3 is a perspective view of the preferred cutting apparatus, showing the workboard and extension with an alignable groove.

As best shown in FIG. 3, in highly preferred embodiments, workboard 12 and extension 14 are connected with hinge 36, which when opened provides an extended work surface. Groove 16 aligns with groove 38 to form a continuous groove extending along the combined length of workboard 12 and extension 14.

Figure 2:
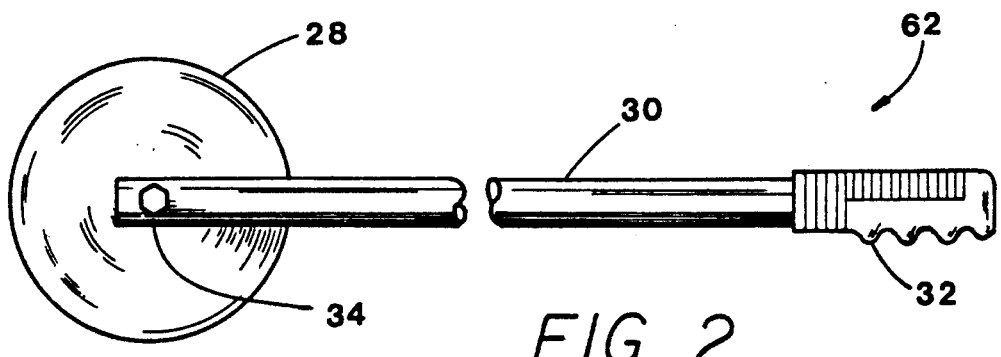
FIG. 2 is a perspective view of the blade and handle mechanism.

As shown in FIG. 2, blade mechanism 62 is comprised of a substantially round blade 28, handle 30, and grip 32. Blade 28 turns on an axis substantially perpendicular to handle 30 through attachment means 34, and may be moved through groove 16, 18 or 38. When fiberglass insulation is placed on workboard 12, extension 14, or both, blade 28 may divide the insulation at groove 16, 18, or 38. In preferred embodiments, blade 28 has a width such that it is freely received by groove 16, 18 or 38. In highly preferred embodiments, the groove-to-blade width ratio is chosen such that cutting operations are not impeded by blade 28 drawing uncut insulation into any groove.

Figure 4:
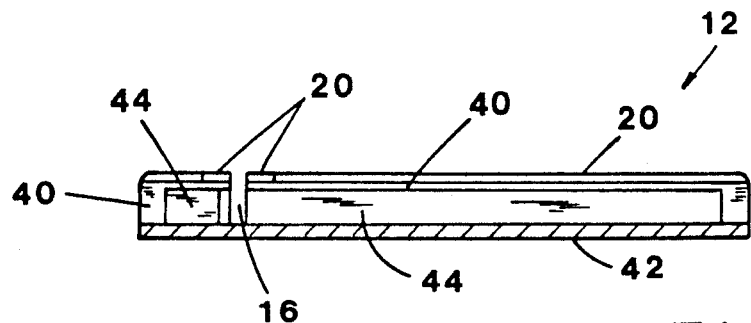
FIG. 4 is a cross-section of FIG. 3 along 4—4.
Figure 5:
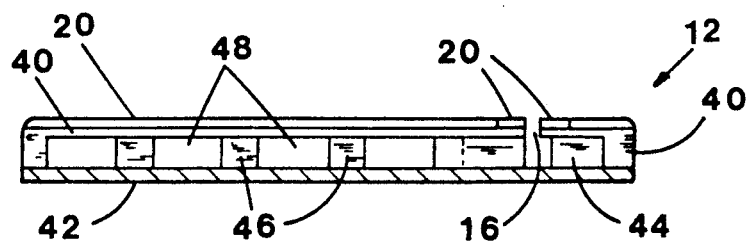
FIG. 5 is a cross-section of FIG. 3 along 5—5.

As shown in FIGS. 4 and 5, in highly preferred embodiments, workboard 12 comprises a continuous lower member 42 and upper members 40 having opposed inner edges spaced from one another to form the sides of perpendicular grooves 16 and 18. Plug 44 is sandwiched between upper members 40 and lower member 42 on the peripheral side of grooves 16 and 18. Spacers 46 are sandwiched between upper members 40 and lower member 42 on the internal sides of grooves 16 and 18, and vents 48 permit the removal of fiberglass leavings and prevent obstruction of either groove. An identical sandwich arrangement is associated with extension 14 and groove 38.

Figure 6:
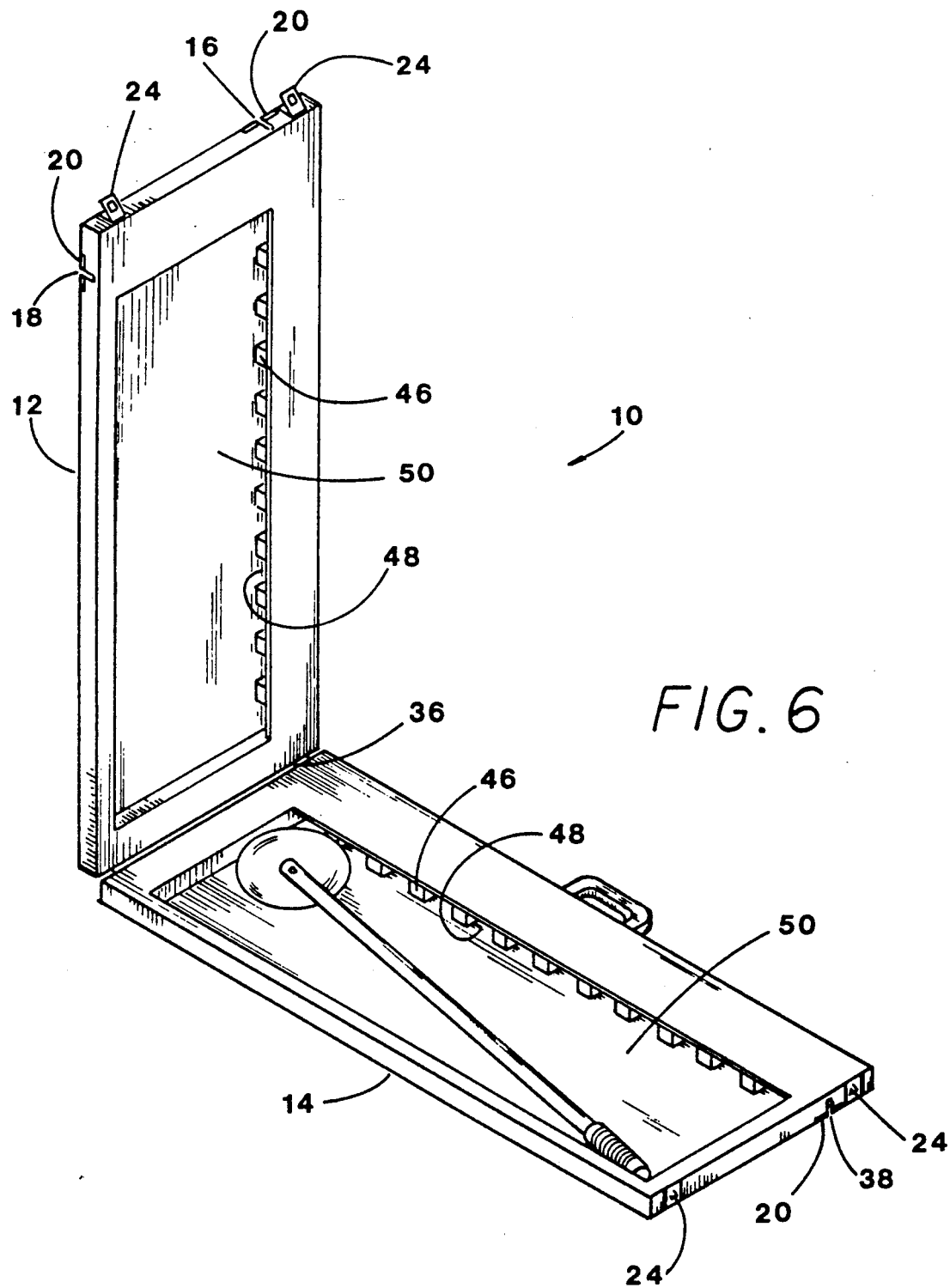
FIG. 6 is a perspective view of the preferred cutting apparatus, showing the workboard, the extension, and container for storage of the blade and handle.

As best shown in FIG. 6, workboard 12 and extension 14 comprise container 50 for storage and transport of blade mechanism 62.

Figure 7:
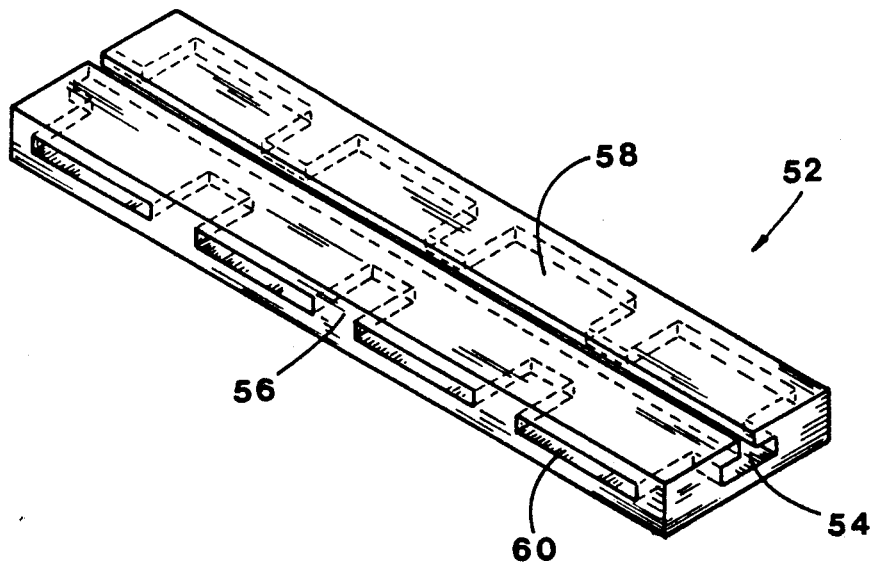
FIG. 7 is a full perspective view of a preferred embodiment of the workboard.

As shown in FIG. 7, work surface 52 is a preferred embodiment for smaller, less complex cutting operations and features substantially unit construction about groove 54. Fiberglass insulation placed on work surface 52 is divided at groove 54 as blade mechanism 62 is moved through it. Spacers 56 create chambers 58 and vents 60 which permit the removal of fiberglass leavings and prevent obstruction of groove 54.

Workboard 12 and extension 14 may be made using a variety of materials. A sturdy plywood is highly preferred. A preferred material for overlay 20 and work surface 52 is a transparent, high-impact strength, rigid plastic, such as an acrylic polymer. Acceptable material choices for these and other parts of the invention will be apparent to those skilled in the art and aware of this invention.

This invention has been described in connection with a fiberglass cutting apparatus. However, the invention has implications beyond those described above, including but not limited to the cutting of other types of insulation and construction materials.

While the principles of this invention have been described in connection with specific embodiments, it should be understood clearly that these descriptions are made only by way of example and are not intended to limit the scope of the invention.

I claim:

1. A fiberglass insulation cutting apparatus for jobsite use comprising:
    a workboard having an upwardly-facing groove thereacross and including a substantially continuous lower member forming the bottom of said groove and two upper members which are above the lower member and spaced from the lower member to form a void extending laterally from the groove between the lower member and the upper members, the upper members having opposed inner edges spaced from one another to form the sides of the groove;
    the two upper members each being formed of a pair of submembers having submember inner edges, the submembers of both upper members being coplanar and positioned and arranged such that their inner edges form a second groove intersecting and substantially perpendicular to the first-mentioned groove, said flat lower member being of sufficient dimension to form the bottom of said second groove;
    means insertable in the groove and movable therealong to cut fiberglass insulation; and
    a free handle supporting the cutting means and grippable by a worker to move the cutting means in the groove across the workboard;
    whereby fiberglass insulation placed on the workboard may readily be divided at the groove and fiberglass leavings from cutting operations can move laterally away from the groove into the void.

2. A fiberglass insulation cutting apparatus for jobsite use comprising:
    a workboard having an upwardly-facing groove thereacross;
    means insertable in the groove and movable therealong to cut fiberglass insulation;
    a free handle supporting the cutting means and grippable by a worker to move the cutting means in the groove across the workboard; and
    a workboard extension movably attached to the workboard, said workboard extension having an extension groove, the workboard extension and extension groove being alignable with said workboard and its groove, respectively, to provide an extended work surface with an extended groove; whereby fiberglass insulation of varying sizes placed on the work surface may readily be divided at the groove.

3. The cutting apparatus of claim 2 wherein the workboard and workboard extension, when not in use, are secured together in mutually overlying fashion.

4. The cutting apparatus of claim 3 wherein the workboard and workboard extension are joined by a hinge such that the workboard and workboard extension may be folded onto each other when not in use.

5. The cutting apparatus of claim 3 wherein said workboard and workboard extension, when folded together, form an inner container for storage of the cutting and moving means when not in use.

6. The cutting apparatus of claim 2 wherein the workboard has a lower member forming the bottom of the groove and two upper members spaced above the lower member to form a void extending laterally from the groove, the upper members having opposed spaced inner edges forming said groove, whereby fiberglass leavings from cutting operations can move laterally away from the groove into the void.

7. The cutting apparatus of claim 6 wherein said void is formed by spacers sandwiched between said upper and lower members.

8. The cutting apparatus of claim 7 wherein the spacers are spaced along said groove such that support is provided along the groove while still allowing movement of fiberglass leavings away from the groove during cutting operations.

9. The cutting apparatus of claim 6 wherein the inner edges of said upper members are reinforced by overlay members secured to the upper members along said groove.

10. The cutting apparatus of claim 9 wherein the overlay members are inset in said upper members.

11. The cutting apparatus of claim 6 wherein the workboard has a non-skid surface such that fiberglass insulation placed thereon may be cut without significant shifting during cutting operations.

12. The cutting apparatus of claim 6 wherein the workboard has linear markings such that fiberglass insulation may be positioned thereon for accurate cutting without separate measuring steps.

13. The cutting apparatus of claim 6 wherein the cutting means is a substantially round disk blade rotatably attached to the handle, said disk blade having a radius greater than the combined depth of said groove and fiberglass insulation thickness.

14. The cutting apparatus of claim 13 wherein the blade has a width such that it is freely received by said groove, whereby fiberglass insulation placed on the workboard is cut as the blade is moved in the groove.

15. The cutting apparatus of claim 14 wherein the groove width and groove-to-blade width ratio are chosen such that the blade is freely received by said groove while cutting insulation without drawing uncut insulation into the groove to an extent impeding cutting operations.

16. The cutting apparatus of claim 13 wherein the handle is elongated with upper and lower ends, the disk blade being attached at the lower end of said handle, whereby fiberglass insulation may readily be cut from a standing position.

17. The cutting apparatus of claim 16 wherein the groove width and groove-to-blade width ratio are chosen such that the blade is freely received by said groove while cutting insulation without drawing uncut insulation into the groove to an extent impeding cutting operations.

18. The cutting apparatus of claim 6 wherein the handle is elongated with upper and lower ends, the cutting means being attached at the lower end of said handle, whereby fiberglass insulation may be cut from a standing position.

19. The cutting apparatus of claim 6 wherein the lower member forms a void bottom which is substantially coplanar with the bottom of the groove, whereby lateral movement of fiberglass leavings away from the groove is facilitated.

20. The cutting apparatus of claim 6 wherein each of the two upper members includes a pair of submembers having submember inner edges, the submembers of both upper members being mutually coplanar and positioned and arranged such that their inner edges form a second groove which intersects and is substantially perpendicular to the first-mentioned groove, said flat lower member being of sufficient dimension to form the bottom of said second groove.

* * * * *